No. 684,108. Patented Oct. 8, 1901.
J. SAVOIE.
PROCESS OF LINING PNEUMATIC TIRES.
(Application filed May 29, 1901.)
(No Model.)

WITNESSES.
Charles T. Hannigan
Horace E. Bates

INVENTOR.
Joseph Savoie
by James L. Jenks
Atty.

UNITED STATES PATENT OFFICE.

JOSEPH SAVOIE, OF CENTRAL FALLS, RHODE ISLAND.

PROCESS OF LINING PNEUMATIC TIRES.

SPECIFICATION forming part of Letters Patent No. 684,108, dated October 8, 1901.

Application filed May 29, 1901. Serial No. 62,447. (No specimens.)

*To all whom it may concern:*

Be it known that I, JOSEPH SAVOIE, a citizen of the United States of America, and a resident of Central Falls, county of Providence, and State of Rhode Island, have invented certain new and useful Improvements in Processes of Lining Pneumatic Tires, of which the following is a specification.

My invention has for its object an improved process of lining pneumatic tires throughout with a continuous lining of caoutchouc or other equivalent substance, and the mode of practicing my invention is as follows: A suitable quantity of a fluid solution of caoutchouc or other equivalent substance is introduced by means of the air-valve into the tire, which has previously had its air forced out by a compression of the entire tire. The compression of the tire and the consequent emptying of the same of its air are readily accomplished by squeezing the tire with the fingers of both hands at a point diametrically opposite the air-valve and while retaining the compression bringing both hands simultaneously along the tire to the air-valve. This leaves the tire collapsed. A compressible tube containing a sufficient quantity of the fluid caoutchouc or other suitable compound is then screwed or otherwise inserted into the air-valve and its contents or so much as may be necessary squeezed into the tire, the latter being secured in a vertical position, with the valve at the lowest point. The collapsible tube is then removed from the valve and the latter is connected with a common air-pump and the tire inflated. The first stroke of the pump forces an air-bubble into the liquid caoutchouc, and as more air enters this bubble increases in size, driving the surplus caoutchouc before it around the whole inner surface of the tire and leaving such entire inner surface covered with a thin coating of caoutchouc. The extremities of the bubble of air running around the tire in both directions meet at or near a point diametrically opposite the air-valve and coming together make a film or partition, which is sometimes ruptured and which sometimes endures, this result, however, in neither case affecting the lining. The tire is now lined throughout with a film or coating of caoutchouc of a thickness dependent upon the quantity of material used, and this film by its adhesive properties becomes integral with the tire itself. After the tire is completely inflated a little air is allowed to escape through the valve and the tire is again inflated, and this escape and reinflation is repeated once or twice, which causes the lining-film to set or harden.

The accompanying drawings illustrate my process.

Figure 1 shows the collapsed tire with a portion of the liquid caoutchouc introduced through the valve; Fig. 2, the same with a bubble of air introduced; Fig. 3, the tire completely inflated; and Fig. 4, a cross-section of the tire, showing the lining somewhat exaggerated in thickness.

In Fig. 1, A is the collapsed tire; $b$, the air-valve; $c$, a compressible tube of fluid solution of caoutchouc or other equivalent substance, and $d$ a portion of the same introduced into the tire through the valve.

Figure 1:
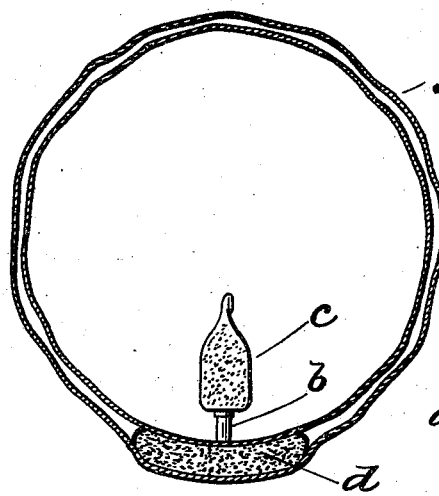
Figure 2:
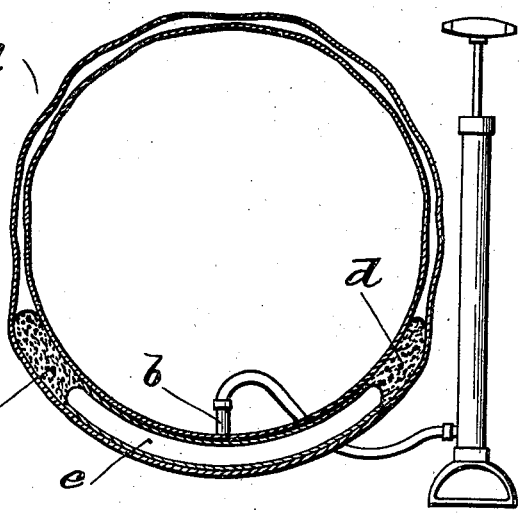
Fig. 2 shows the tire connected with the air-pump and a bubble of air $e$ introduced into the fluid caoutchouc.
Figure 3:
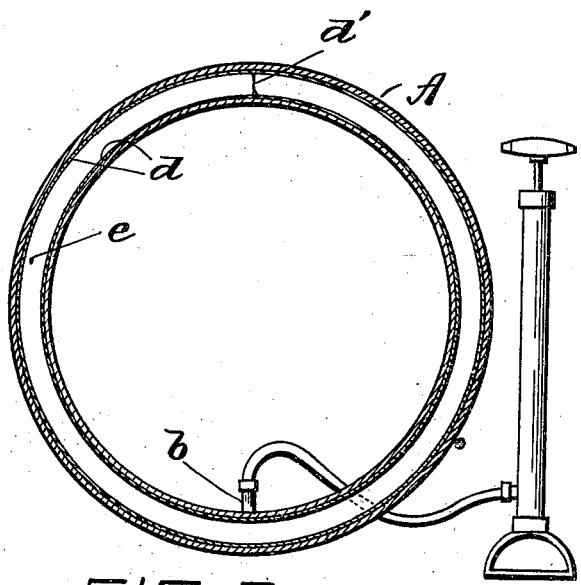
Fig. 3 shows the tire completely inflated, $d$ being the lining or coating of caoutchouc spread over the entire inner surface of the tire, and in this figure $d'$ shows the film or partition formed by the meeting of the opposite ends of the bubble of caoutchouc.
Figure 4:
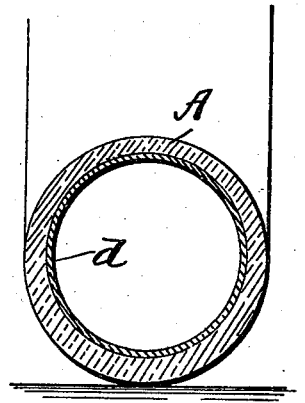

In Fig. 4 A shows an exaggerated cross-section of the substance or fabric of the tire and the lining $d$.

It will be seen that my process is equally applicable to new tires to remedy accidental defects or porosity and to old ones for the purpose of filling punctures or other injuries to the tire.

Having now described my invention, what I claim, and desire to secure by Letters Patent, is—

1. The herein-described process of lining pneumatic tires, consisting in first collapsing the tire to empty it of air, introducing into the tire at its lowest point fluid solution of caoutchouc or other equivalent substance, in sufficient quantity to form a mass substantially filling the tire at the point at which it is introduced, introducing air into the mass of fluid to form a bubble therein, and distributing the fluid in a film throughout the interior of the tire, and simultaneously expanding the tire by introducing air into the bubble; substantially as described.

2. The herein-described process of lining pneumatic tires, consisting in first collapsing the tire to empty it of air, introducing into the tire at its lowest point fluid solution of caoutchouc or other equivalent substance, in sufficient quantity to form a mass substantially filling the tire at the point at which it is introduced, introducing air into the mass of fluid to form a bubble therein, distributing the fluid in a film throughout the interior of the tire, and simultaneously expanding the tire by introducing air into the bubble, and hardening the film by permitting part of the air to escape from the tire and reinflating; substantially as described.

Signed at Pawtucket this 20th day of May, 1901.

JOSEPH X SAVOIE.
his mark

Witnesses:
JAMES L. JENKS,
IRA P. ALLEN.